Aug. 24, 1965 C. C. ALFORD ETAL 3,201,882

TELEPHONE NUMBER SET-UP DEVICE

Filed Sept. 13, 1963

INVENTORS
CARL C. ALFORD
EARL O. BEAR

BY C. E. Stratton

ATTORNEY

United States Patent Office 3,201,882
Patented Aug. 24, 1965

3,201,882

TELEPHONE NUMBER SET-UP DEVICE

Carl C. Alford, 1214 Elm St., and Earl O. Bear, 1215 Linden Ave., both of Glendale, Calif.

Filed Sept. 13, 1963, Ser. No. 308,771
5 Claims. (Cl. 40—96)

This invention relates to a device for setting up a number, particularly a ten-digit group of numbers, such as comprises the area, exchange, and individual numbers of a telephone designation.

It becomes increasingly difficult, especially with a number that comprises a plurality of digits, to remember the same so it may be written down or otherwise recorded permanently for future reference. The present invention has for an object to provide a simple and handy device that may be operated with one hand, to set up the digits of a telephone number as the same are being relayed, by telephone for instance, to the user, thereby providing a temporary record that may be consulted when making a permanent record of said telephone number.

Another object of the invention is to provide a device of the character referred to that may be operated to wipe out the number after recording of the same, so the device is prepared to have another number set up thereon.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

Figure 1:
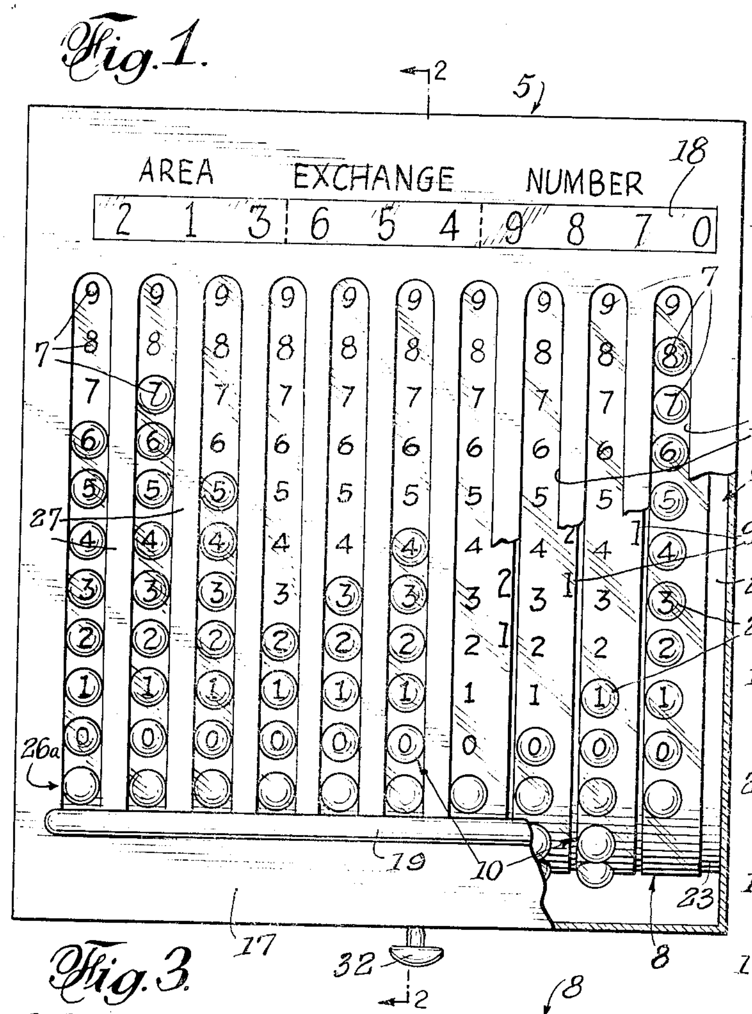
FIG. 1 is a partly broken front elevational view of the present number set-up device.

The present number set-up device comprises, generally, an outer case 5, an inner core 6 provided with a plurality of vertical rows of numbers 7 imprinted on the front face of the case, a plurality of endless bands or loops 8 trained around the core in register with the rows of numbers 7, a row of numbers 9 on each band 8 in offset relation to the numbers 7, means 10 on each band engageable by the finger to move the bands selectively on the core, and means 11 to return the bands that are moved to their original positions.

The case 5 is preferably of parallelepiped form and, except for an opening 15 in the lower end wall thereof, and a set or complement of vertical slots 16, is closed to enclose the core 6. Said slots 16 are provided in the front wall 17 of the case, an elongated transverse window 18 being provided in said wall above the upper ends of the slots 16, and a stop or limit bar or bead 19 being provided along the lower ends of said slots. Since a telephone number may comprise ten digits, the present device is constructed to show a ten-digit set-up. Accordingly, there are ten slots 16 in the front wall 17.

Figure 2:
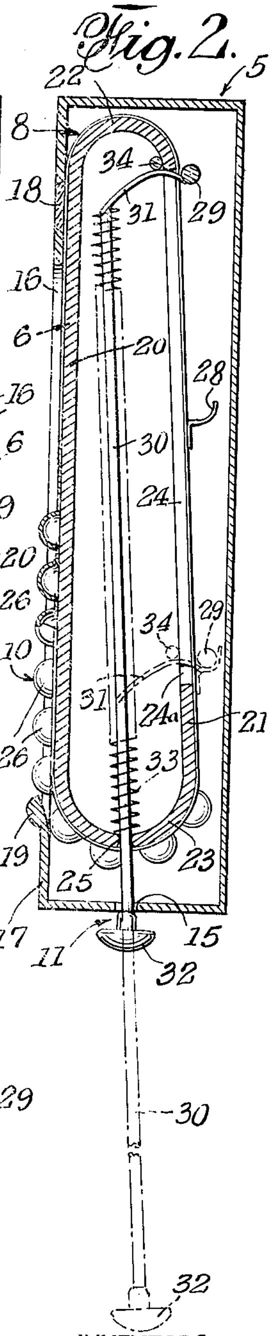
FIG. 2 is a cross-sectional view as taken on the line 2—2 of FIG. 1.
Figure 3:
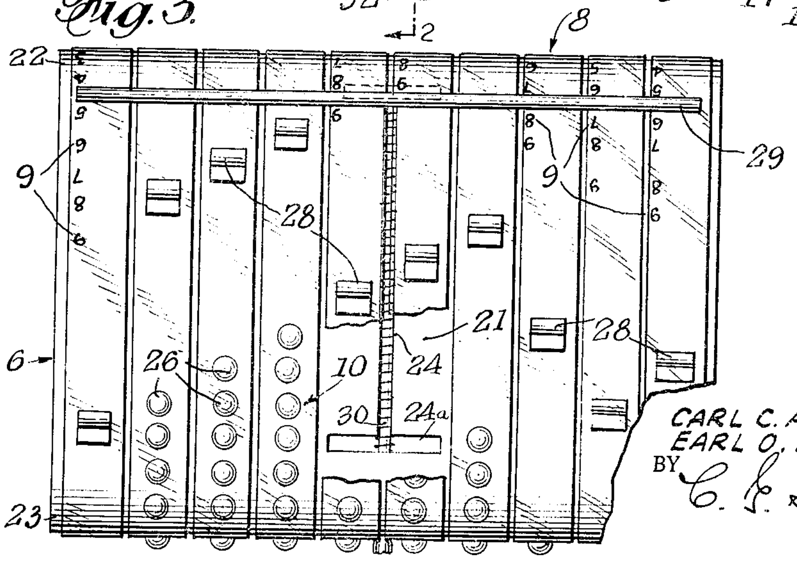
FIG. 3 is a rear and partly broken view, to a somewhat smaller scale, of the operative component of the device.

The core 6 is formed to have a front wall 20, a rear wall 21, an upper curved end 22 to connect the upper ends of the walls 20 and 21, and a lower and preferably larger curved end 23 to connect the lower ends of said walls. The interior of said core is preferably hollow, as shown. The core is affixed in the case 5 in any suitable manner with the front wall 20 thereof adjacent and parallel to the inner face of the case wall 17. The rear wall 21 of the core, as shown in FIGS. 2 and 3, is provided with a preferably central vertical slot 24 that extends from the curved end 22 and terminates above the curved end 23 at a short transverse slot 24*a*. The lowermost point of the lower curved end 23 is provided with a hole 25 that is in substantial alignment with the opening 15 in the lower end wall of the case 5.

The vertical rows of numbers 7, in this case from "9" to "0," in each row are in register with the slots 16 and are visible, therefore, from the front of the device. The numbers "9" are located so as to be visible at the upper ends of slots 16; the numbers "0" are located in spaced relation to the lower ends of said slots and are also visible therethrough; and all the numbers in between are uniformly spaced at the spacing of the numbers "0" from the lower ends of the slots.

The loops or endless bands 8 are so trained around the core 6 as to slide freely when moved and retain the position to which moved. Said bands are substantially wider than the slots 16 and are held in register by the means 10 which are here shown as rows of embossments 26 formed in the bands and of a diametral size to freely engage the opposite edges of the slot 16. The bands are thus held against lateral shifting by the embossments. The rows of numbers 7 are visible through the bands since the same are formed of thin, flexible and transparent material. There are ten embossments on each band, spaced according to the spacing of the rows of numbers 7, these numbers being visible through the embossments as well as through other portions of the bands exposed through the slots 16.

The rows of numbers 9 on the bands 8 are offset with respect to the embossments 26 so that said numbers, when brought by movement of the bands to the front of the core, are in register with and hidden by the front wall portions 27 between the slots 16. Thus, said numbers 9 are visible only through the window 18 on a one-at-a-time basis, as the bands are adjusted. Said rows of numbers, from "0" to "9," are spaced according to the spacing of numbers 7 and of embossments 26, the same being so oriented on the bands with respect to the embossments 26 that with the uppermost embossment in register with the number "9" of the numbers 7, no number shows in the window 18. When it is desired to show the number "0" of any band 8 in the window 18, the forefinger is placed on the embossment that is in register with the "0" on the core wall 20 and this embossment moved by the finger until stopped by the limiting bead 19. Thus, any number of any row of numbers on the bands may be brought into register with the window 18 by moving the bands by means of the embossments although the same numbers are visible. The number set up in the window 18 of FIG. 1 is 213–654–9870. The ten embossments in the horizontal row 26*a*, as stopped by the bead 19, were initially in register with the same numbers of the rows of numbers 7 when the window 18 was blank.

The means 11 is shown as hooks or the like 28 on the bands 8 so oriented with the embossments 26 that with the uppermost embossments at the upper ends of the slots 16, the hooks are in line with the lower end of the slot 24 in the rear wall of the core 6. FIG. 3 shows how said hooks assume locations conforming to the adjusted movements of the bands, as set up in FIG. 1. The means 11 further comprises a restoring bar 29 that extends transversely across the rear of the core over the bands 8 and is connected to the upper end of a stem 30 by a member 31 that extends through the vertical slot 24 of the core. Said stem extends through the hole 25 and the opening 15 and is provided with a pull knob 32. A spring 33 around the stem within the hollow of the core biases the stem to a retracted position that retains the restore bar 29 at its uppermost position, as in FIGS. 2 and 3. A restrainer bar 34 is affixed to the member 31 in such spaced relation to the restore bar that the same may, after being passed through the slot 24*a*, restrain the means 11 for projected and retracted movement in the core 6.

In practice, before the knob 32 is affixed to the stem, the latter, after the spring 33 has been threaded onto the end of the stem, is inserted through the slot 24 and the end inserted in and through holes 25 and 15. Now, by a slight flexure of the stem, the restrainer bar 34 is moved through the slot 24*a* and, upon release, the stem and the restore bar are biased upwardly by spring 33. The knob 32 is secured to the stem and the means 11 is assembled so the same, upon pulling on the knob 32, engages the hooks 28 and by so doing, returns the bands to their initial position wherein the window 18 is blank. Upon release of the knob, the expansion of spring 33 returns the restore bar to raised position, readying the device to have another number set up thereon.

Of course, the "area" digits may not be used, except as needed and the seven "exchange" and "number" digits may be set up as hereinbefore described.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A number set-up device comprising:

(a) a housing with a front wall having a plurality of slots in side-by-side arrangement, and a window above and transverse to said slots, (b) a core within said housing and provided with a front wall adjacent to the inner side of the front wall of the housing and provided with a plurality of rows of numbers exposed through the slots in the housing wall, (c) a plurality of similar and transparent bands trained around the core in register with the housing slots and the rows of numbers on the core, the latter being visible through said bands, (d) a row of numbers on each band out of register with the slots of the housing wall, (e) transparent embossments on said bands extending into the slots to retain the bands in the mentioned register with the numbers on the core, said embossments constituting finger-operable means to move the bands selectively, around the core to bring the numbers on the respective bands into view through the window, according to the degree of movement of the respective bands, and (f) means to return the bands to their initial position.

2. A number set-up device according to claim 1 in which the numbers on the core wall guide the user to engage an embossment of each band oriented to the number desired to be shown in the window, and an aligned stop for all of the bands to limit the band-adjusting movement.

3. A number set-up device comprising:

(a) a housing with a front wall having a plurality of slots in side-by-side arrangement, and a window above and transverse to said slots, (b) a core within said housing and provided with a front wall adjacent to the inner side of the front wall of the housing and provided with a plurality of rows of numbers exposed through the slots in the housing wall, (c) a plurality of similar and transparent bands trained around the core in register with the housing slots and the rows of numbers on the core, the latter being visible through said bands, (d) a row of numbers on each band out of register with the slots of the housing wall, (e) transparent embossments on said bands extending into the slots to retain the bands in the mentioned register with the numbers on the core, said embossments constituting finger-operable means to move the bands, selectively, around the core to bring the numbers on the respective bands into view through the window, according to the degree of movement of the respective bands, (f) each band, on the rear side of the core, being provided with a hook, and (g) means to engage said hooks to move them and, thereby, return the bands to their initial positions.

4. A number set-up device comprising:

(a) a housing with a front wall having a plurality of slots in side-by-side arrangement, and a window above and transverse to said slots, (b) a core within said housing and provided with a front wall adjacent to the inner side of the front wall of the housing and provided with a plurality of rows of numbers exposed through the slots in the housing wall, (c) a plurality of similar and transparent bands trained around the core in register with the housing slots and the rows of numbers on the core, the latter being visible through said bands, (d) a row of numbers on each band out of register with the slots of the housing wall, (e) transparent embossments on said bands extending into the slots to retain the bands in the mentioned register with the numbers on the core, said embossments constituting finger-operable means to move the bands selectively, around the core to bring the numbers on the respective bands into view through the window, according to the degree of movement of the respective bands, (f) each band, on the rear side of the core, being provided with a hook, and (g) a restore bar spanning across the upper rear portion of the core, and (h) means to move said bar to engage and move said hooks to restore the bands to their initial positions.

5. A number set-up device comprising:

(a) a housing with a front wall having a plurality of slots in side-by-side arrangement, and a window above and transverse to said slots, (b) a core within said housing and provided with a front wall adjacent to the inner side of the front wall of the housing and provided with a plurality of rows of numbers exposed through the slots in the housing wall, (c) a plurality of similar and transparent bands trained around the core in register with the housing slots and the rows of numbers on the core, the latter being visible through said bands, (d) a row of numbers on each band out of register with the slots of the housing wall, (e) transparent embossments on said bands extending into the slots to retain the bands in the mentioned register with the numbers on the core, said embossments constituting finger-operable means to move the bands selectively, around the core to bring the numbers on the respective bands into view through the window, according to the degree of movement of the respective bands, (f) each band, on the rear side of the core, being provided with a hook, (g) a restore bar spanning across the upper rear portion of the core, and (h) a spring-biased stem, having an operating rod and connected to said restore bar to move the latter to engage the hooks, and return the bands to their initial positions.

References Cited by the Examiner

UNITED STATES PATENTS

| | | | |
|---|---|---|---|
| 983,682 | 2/11 | Cheape | 235—71 |
| 1,700,712 | 1/29 | Brown | 40—96 |
| 2,129,265 | 9/38 | Duby | 235—71 X |
| 2,270,137 | 1/42 | O'Brien | 116—135 |
| 2,797,046 | 6/57 | Carlstedt | 235—71 |

CHARLES A. WILLMUTH, *Primary Examiner.*